(12) United States Patent
Huo et al.

(10) Patent No.: US 11,895,360 B2
(45) Date of Patent: Feb. 6, 2024

(54) METHOD FOR WAKING UP AUDIO DEVICE, AND DISPLAY APPARATUS

(71) Applicant: Hisense Visual Technology Co., Ltd., Shandong (CN)

(72) Inventors: Junyi Huo, Shandong (CN); Suying Wang, Shandong (CN); Weilan Chen, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/696,517

(22) Filed: Mar. 16, 2022

(65) Prior Publication Data

US 2022/0210504 A1    Jun. 30, 2022

Related U.S. Application Data

(63) Continuation of application No. PCT/CN2020/101164, filed on Jul. 9, 2020.

(30) Foreign Application Priority Data

Mar. 16, 2020   (CN) .......................... 202010183433.0

(51) Int. Cl.
| | | |
|---|---|---|
| H04N 21/4363 | (2011.01) | |
| H04N 21/41 | (2011.01) | |
| H04N 21/443 | (2011.01) | |

(52) U.S. Cl.
CPC ... *H04N 21/43635* (2013.01); *H04N 21/4135* (2013.01); *H04N 21/41265* (2020.08); *H04N 21/4436* (2013.01)

(58) Field of Classification Search
None
See application file for complete search history.

(56) References Cited

U.S. PATENT DOCUMENTS

9,693,003 B1 * 6/2017 Vassigh .............. H04N 21/4854
10,152,294 B2 * 12/2018 Jan ......................... G06F 3/1454
10,200,733 B1 * 2/2019 Adusumilli ...... H04N 21/42204
(Continued)

FOREIGN PATENT DOCUMENTS

| CN | 1952892 A | 4/2007 |
|---|---|---|
| CN | 101513046 A | 8/2009 |

(Continued)

OTHER PUBLICATIONS

International Search Report, dated Dec. 18, 2020, from PCT/CN2020/101164 filed Jul. 9, 2020.

*Primary Examiner* — John W Miller
*Assistant Examiner* — Sean N. Haiem
(74) *Attorney, Agent, or Firm* — Workman Nydegger

(57) ABSTRACT

Disclosed are a method for waking up an audio device, and a display apparatus. The method includes: while the display apparatus is in a standby state, in response to a power command input from a user, controlling the display apparatus to enter a power-on state from a standby state, and in response to determining that there is an audio device among a plurality of external devices connected with the display apparatus via HDMI interfaces, controlling the audio device to enter a power-on state first, and then controlling other external devices among the plurality of external devices except for the audio device to enter a power-on state.

8 Claims, 5 Drawing Sheets

(56) References Cited

U.S. PATENT DOCUMENTS

| | | | |
|---|---|---|---|
| 2012/0023267 A1* | 1/2012 | Sasaki | H04N 5/765 710/14 |
| 2013/0051584 A1* | 2/2013 | Higuchi | H04N 21/8106 381/123 |
| 2014/0368740 A1* | 12/2014 | Roberts | G06F 13/4282 348/705 |
| 2015/0103253 A1* | 4/2015 | Higuchi | H04N 5/602 348/705 |
| 2017/0180918 A1* | 6/2017 | Yang | H04N 5/63 |

FOREIGN PATENT DOCUMENTS

| | | | |
|---|---|---|---|
| CN | 101521765 A | 9/2009 | |
| CN | 102186112 A | 9/2011 | |
| CN | 102356634 A | 2/2012 | |
| CN | 104756506 A | 7/2015 | |
| CN | 104811334 A | 7/2015 | |
| CN | 105721794 A | 6/2016 | |
| CN | 105828140 A | 8/2016 | |
| CN | 106162336 A | 11/2016 | |
| CN | 108810630 A | 11/2018 | |
| CN | 108847232 A | 11/2018 | |
| CN | 109120999 A | 1/2019 | |
| CN | 109271204 A | 1/2019 | |
| CN | 111381896 A | 7/2020 | |

\* cited by examiner

METHOD FOR WAKING UP AUDIO DEVICE, AND DISPLAY APPARATUS

CROSS REFERENCE TO RELATED APPLICATIONS

This application is a continuation application of International Application No. PCT/CN2020/101164 filed on Jul. 9, 2020, which claims priority to Chinese Patent Application No. CN 202010183433.0 filed on Mar. 16, 2020, the entire contents of which are incorporated herein by reference.

FIELD

The disclosure relates to the display technology, in particular to a method for waking up an audio device, and a display apparatus.

BACKGROUND

Currently, a display apparatus may be connected with an external device through a high-definition multimedia interface (HDMI) interface, for example, a set-top box, a Netbox, a digital video disc (DVD), an audio device, etc.

In a scenario where the display apparatus is connected with a plurality of external devices, it takes a relatively longer time for the display apparatus to wake up external devices after turning on the display apparatus. As a result, after the display apparatus is powered on, the audio device can only output a sound after the longer period of time, causing poor user experience.

SUMMARY

The embodiments of disclosure provide a display apparatus, including:
a display;
a user input interface configured to receive an instruction input from a user;
a plurality of HDMI interfaces configured to connect with a plurality of external devices;
a power management module configured to at least control the display to power-down or power on to cause the display apparatus to enter into a standby state or a power-on state; and
a controller in connection with the display, the user input interface and the power management module and configured to:
in a case where the power management module is controlled to cause the display apparatus to enter into the standby state, in response to a power command input from the user, control the power management module to cause the display apparatus to enter the power-on state from the standby state, and,
in response to determining that there is an audio device among the plurality of external devices, control the audio device to enter the power-on state first, and then control other external devices than the audio device among the plurality of external devices to enter the power-on state.

In some embodiments, an external device is determined to be the audio device through a logical address allocated to the external device.

In some embodiments, the controller is further configured to:

obtain device-related information of the audio device, and send a waking-up instruction to the audio device to cause the audio device to enter the power-on state; and
obtain device-related information of the other external device among the plurality of external devices, and send a waking-up instruction to each of the other external devices to cause each of the other external devices to enter the power-on state.

In some embodiments, the device-related information at least includes one of the following: a device physical address, a device name, a device manufacturer, or a device power state.

In some embodiments, the controller is further configured to: obtain the device physical address, the device name, the device manufacturers, and the device power states in time order.

The embodiments of disclosure provide a method for waking up an audio device in a display apparatus, wherein the display device comprises multiple HDMI interfaces for connecting with multiple external devices. The method includes:
while the display apparatus is in a standby state, in response to a power command input from a user, controlling the display apparatus to enter a power-on state from the standby state; and,
in response to determining that there is an audio device among the plurality of external devices, controlling the audio device to enter the power-on state first, and then controlling other external devices than the audio device among the plurality of external devices to enter the power-on state.

In some embodiments, if it is determined that there is the audio device among the plurality of external devices, a logical address of the audio device is stored in a first list which is set in advance, and logical addresses of the other external devices than the audio device among the plurality of external devices are stored in a second list which is set in advance.

In some embodiments, determining whether there is the audio device among the plurality of external devices is by determine whether there is the first list.

In some embodiments, if there is the first list, obtaining device-related information of the audio device first according to the logical address in the first list, and waking up the audio device to be caused to enter the power-on state; and then obtaining device-related information of the other external devices among the plurality of external devices according to the logical addresses in the second list, and waking up each of the other external devices to enter the power-on state.

The embodiments of disclosure provide a display apparatus, including:
a display;
a tuner-demodulator configured to receive and tune a broadcast signal;
a user input interface configured to receive an instruction input from a user;
a plurality of HDMI interfaces configured to connect a plurality of external devices;
a power management module configured to at least control the display to power-down or power on of the display to cause the display apparatus to enter into a power-off state or a power-on state; and
a controller configured to:
in a case where the power management module is controlled to cause the display apparatus to enter into the power-off state, in response to a power command input from the user, control the power management module to cause the display apparatus to enter the power-on state from the power-off state, and in response to determining that there is an audio device among the plurality of external devices, obtain a device physical address and a power state of the audio device, and control the audio device to enter the power-on state.

In some embodiments, the controller is further configured to: after the audio device enters the power-on state, obtain a device name and a device manufacturer of the audio device.

In some embodiments, the controller is further configured to:

decode an audio data stream carried in the broadcast signal, and output, via a HDMI interface, the decoded audio data stream to the audio device connected with the HDMI interface.

In some embodiments, the controller is further configured to:

after successfully obtaining the device physical address and the power state of the audio device in the plurality of external devices, obtain device-related information of other external devices than the audio device in the plurality of external devices, and control the other external devices to enter the power-on state.

The embodiments provide a method for waking up an audio device in a display apparatus, including:

in a case where the display apparatus is in a power-off state, in response to a power command input from a user, controlling the display apparatus to enter a power-on state from the power-off state; and, in response to determining that there is an audio device among the plurality of external devices, obtaining a device physical address and a power state of the audio device, and controlling the audio device to enter the power-on state.

In some embodiments, the method further includes:
after the audio device enters the power-on state, obtain a device name and a device manufacturer of the audio device.

In some embodiments, the method further includes:
receiving a broadcast signal; and decoding an audio data stream carried in the broadcast signal, and outputting, via a HDMI terminal, the decoded audio data stream to the audio device connected with the corresponding HDMI interface.

In some embodiments, the method further includes:
after successfully obtaining the device physical address and the power state of the audio device in the plurality of external devices, obtaining device-related information of other external devices than the audio device in the plurality of external devices, and controlling the other external devices to enter into the power-on state.

DETAILED DESCRIPTION OF THE EMBODIMENTS

In order to make objectives, embodiments and advantages of the disclosure clearer, the disclosure will be clearly and completely described below in combination with the accompanying drawings. Apparently, the described embodiments are only some embodiments of the disclosure, rather than all the embodiments. Based on the embodiments of the disclosure, all other embodiments obtained by those of ordinary skill in the art without creative efforts fall within the protection scope of the disclosure.

Figure 1A:
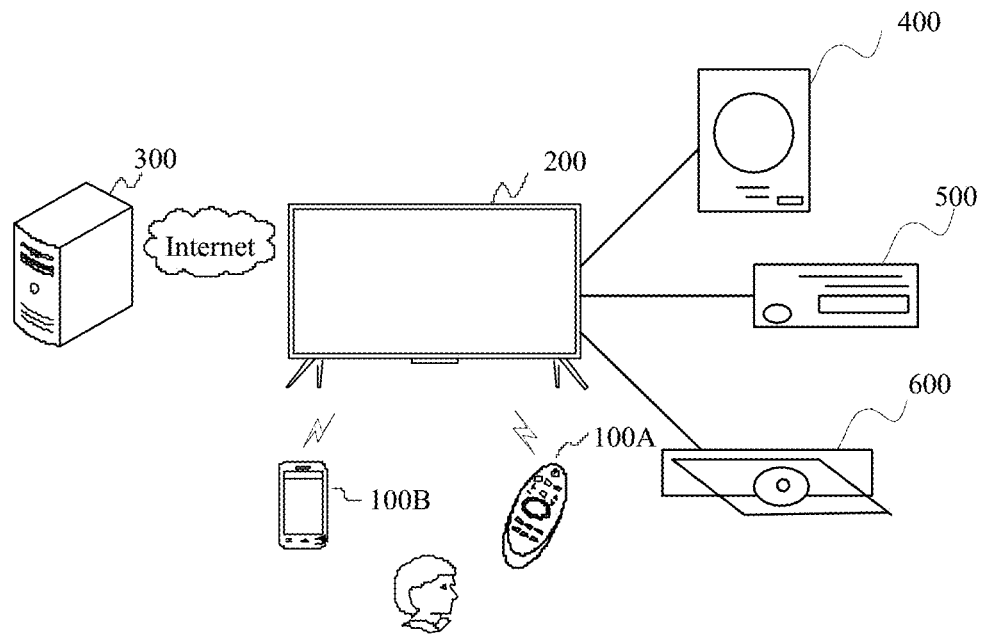
FIG. 1A illustrates a schematic diagram of an operation scenario between a display apparatus and a control device.

FIG. 1A illustrates a schematic diagram of an operation scenario between a display apparatus and a control device. As shown in FIG. 1A, communication between the control device 100 and the display apparatus 200 may be performed in a wired or wireless manner.

The control device 100 is configured to control the display apparatus 200, which may receive a command input from a user, convert the command into an instruction that the display apparatus 200 may recognize and respond to, and play an intermediary role in an interaction between the user and the display apparatus 200. For example, the user operates channel up and channel down keys on the control device 100, and the display apparatus 200 responds to channel up and channel down operations.

The control device 100 may be a remote control 100A, and controls the display apparatus 200 by wireless or other wired methods, including infrared protocol communication or Bluetooth protocol communication, and other short-distance communication methods. The user may control the display apparatus 200 by inputting user instructions through keys on the remote control, voice input, control panel input, and the like. For example, the user may control the display apparatus 200 by inputting corresponding control instructions through volume up/down keys, channel control keys, up/down/left/right direction keys, a voice input key, a menu key, a power key, etc. on the remote control, to realize functions of the display apparatus 200.

The control device 100 may also be an intelligent device, such as a mobile terminal 100B, a tablet computer, a computer, a notebook computer, and the like. For example, the display apparatus 200 is controlled by an application running on the intelligent device. The application program may be configured to provide the user with various controls through an intuitive user interface (UI) on a screen associated with the intelligent device.

Exemplarily, the mobile terminal 100B may install a software application with the display apparatus 200, and implement connection communication through a network communication protocol, so as to achieve a purpose of one-to-one control operation and data communication. For example, the mobile terminal 100B and the display apparatus 200 may be caused to establish a control instruction protocol, and by operating various function keys or virtual buttons of the user interface provided on the mobile terminal 100B, functions of physical keys arranged by the remote control 100A may be realized. Audio and video contents displayed on the mobile terminal 100B may also be transmitted to the display apparatus 200 to implement a synchronous display function.

The display apparatus 200 may provide a broadcast receiving function and a network TV function that a computer supports. The display apparatus may be implemented as a digital television, an Internet television, an Internet protocol television (IPTV), and the like.

The display apparatus 200 may be a liquid crystal display, an organic light emitting display, or a projection device. A specific type, size and resolution of the display apparatus are not limited.

The display apparatus 200 also performs data communication with a server 300 through various communication methods. Here, the display apparatus 200 may be allowed to be in communication through a local area network (LAN), a wireless local area network (WLAN), and other networks. The server 300 may provide various contents and interactions for the display apparatus 200. Exemplarily, the display apparatus 200 may send and receive information, such as receiving electronic program guide (EPG) data, receiving software updates, or accessing a remotely stored digital media library. The server 300 may be one or more types of servers. Other network service contents such as video-on-demand and advertising services are provided through the server 300.

The display apparatus 200 may also be connected with a plurality of external devices 400 through a plurality of HDMI interfaces (not shown in FIG. 1A), and the external devices 400 may be implemented as DVDs, digital boxes, audio devices, and the like. The external devices 400 may provide various multimedia contents and interactions for the display apparatus 200, and the display apparatus 200 may also provide multimedia contents and interactions for the external devices 400.

For example, the external device 400 may provide audio and video data for the display apparatus 200 for playback by the display apparatus 200, and for example, the display apparatus 200 may provide audio data for the external devices 400 for playback by the external devices 400. In FIG. 1A, the display apparatus 200 is connected with three external devices as an example, and it is assumed that the three external devices are an audio device 400, a direct TV set-top box 500, and a DVD 600 respectively.

Figure 1B:
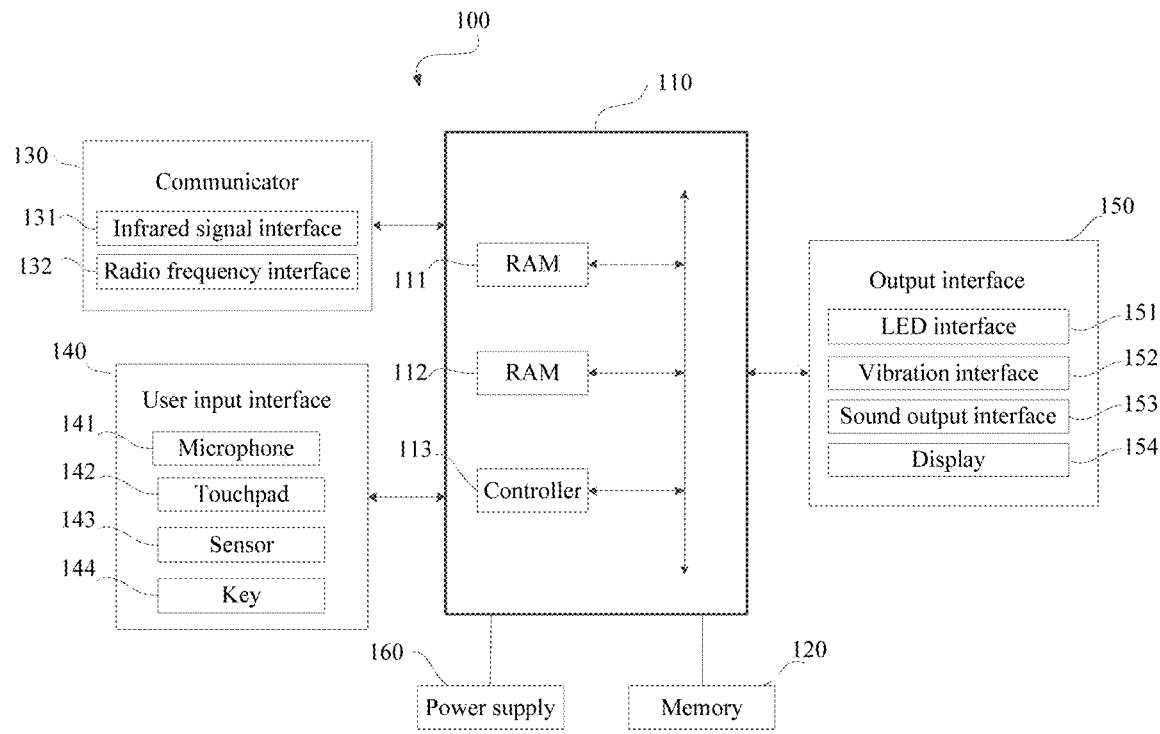
FIG. 1B illustrates a block diagram of configuration of the control device 100 in FIG. 1A.

FIG. 1B illustrates a block diagram of configuration of the control device 100. As shown in FIG. 1B, the control device 100 includes a controller 110, a memory 120, a communicator 130, a user input interface 140, an output interface 150, and a power supply 160.

The controller 110 includes a random access memory (RAM) 111, a read only memory (ROM) 112, a processor 113, a communication interface, and a communication bus. The controller 110 is configured to control running and operation of the control device 100, communication cooperation between internal components, and external and internal data processing functions.

Exemplarily, when an interaction from the user like pressing a key arranged on the remote controller 100A or an interaction like touching a touch panel arranged on the remote controller 100A is detected, the controller 110 may control to generate a signal corresponding to the detected interaction, and sends the signal to the display apparatus 200.

The memory 120 is configured to store various operating programs, data and applications for driving and controlling the control device 100 under control of the controller 110. The memory 120 may store various control signal instructions input from the user.

Under control of the controller 110, the communicator 130 realizes communication of control signals and data signals with the display apparatus 200. For example, the control device 100 sends a control signal (e.g. a touch signal or a button signal) to the display apparatus 200 via the communicator 130, and the control device 100 may receive the signal sent from the display apparatus 200 via the communicator 130. The communicator 130 may include an infrared signal interface 131 and a radio frequency signal interface 132. For example, in the case of the infrared signal interface, the instruction input from the user needs to be converted into an infrared control signal according to an infrared control protocol, and is sent to the display apparatus 200 through an infrared sending module. For another example, in the case of the radio frequency signal interface, the instruction input from the user needs to be converted into a digital signal, is then modulated according to a radio frequency control signal modulation protocol, and then is sent to the display apparatus 200 by a radio frequency transmission module.

The user input interface 140 may include at least one of a microphone 141, a touch pad 142, a sensor 143, a key 144, etc., so that the user may input the instructions related to controlling the display apparatus 200 through voice, touch, gesture, pressing, etc. to the control device 100.

The output interface 150 outputs a user instruction received from the user input interface 140 to the display apparatus 200, or outputs an image or voice signal received from the display apparatus 200. Here, the output interface 150 may include an LED interface 151, a vibration interface 152 that generates vibration, a sound output interface 153 that outputs a sound, a display 154 that outputs images, and the like. For example, the remote control 100A may receive output signals such as audio, video or data from the output interface 150, and display the output signals in a form of image on the display 154, output them in a form of audio on the sound output interface 153, or output them in a form of vibration on the vibration interface 152.

The power supply 160 is configured to provide power support for all elements of the control device 100 under the control of the controller 110. It may be in a form of a battery and related control circuits.

Figure 1C:
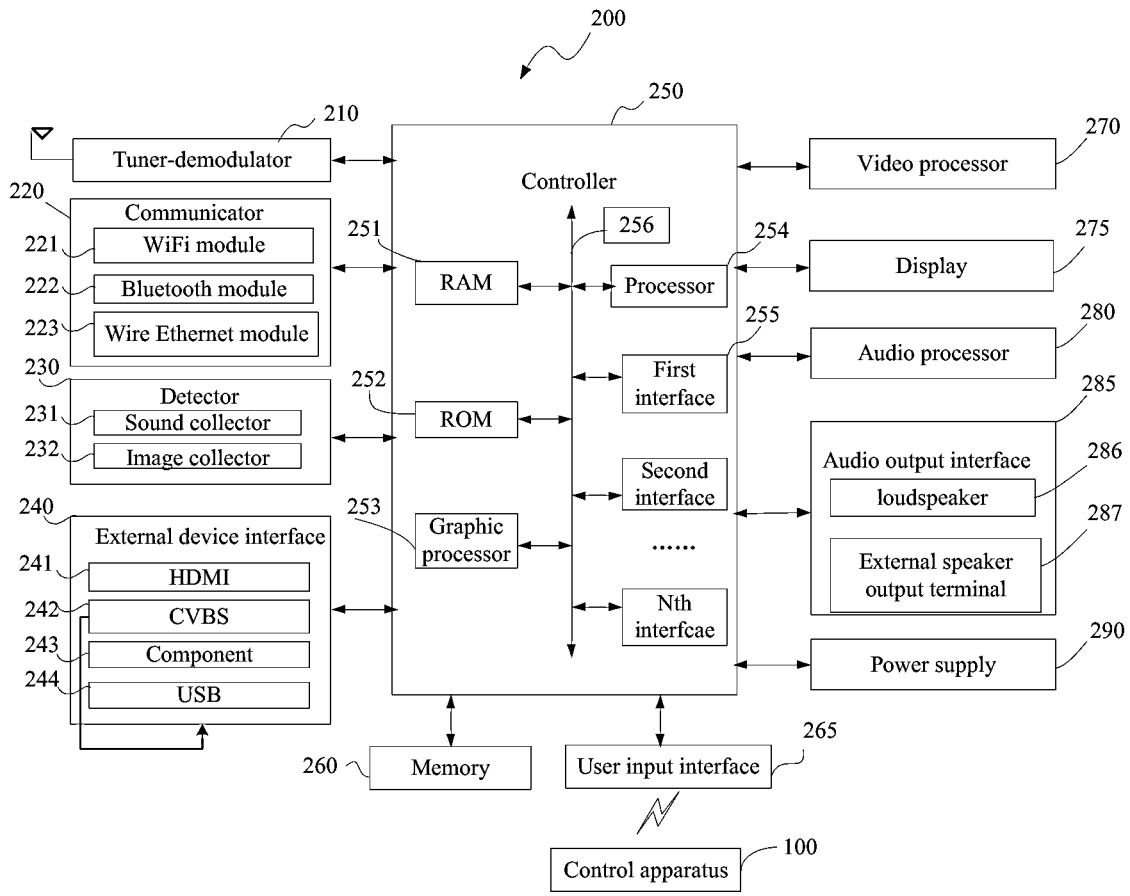
FIG. 1C illustrates a block diagram of configuration of the display apparatus 200 in FIG. 1A.

FIG. 1C illustrates a block diagram of hardware configuration of the display apparatus 200. As shown in FIG. 1C, the display apparatus 200 may include a tuner-demodulator 210, a communicator 220, a detector 230, an external device interface 240, a controller 250, a memory 260, a user input interface 265, a video processor 270, a display 275, an audio processor 280, an audio output interface 285, and a power supply 290.

The tuner-demodulator 210 receives broadcast and television signals in a wired or wireless manner, and may perform modulation and demodulation processing such as amplification, frequency mixing, and resonance, so as to demodulate audio and video signals carried in a frequency of a television channel selected by the user, as well as additional information (e.g. EPG data) from a plurality of wireless or wired broadcast and television signals.

The tuner-demodulator 210 may, according to user's selection and controlled by the controller 250, respond to the frequency of the television channel selected by the user and a television signal carried by the frequency.

The tuner-demodulator 210 may, according to different broadcasting systems of television signals, receive signals in many ways, such as: terrestrial broadcasting, cable broadcasting, satellite broadcasting or Internet broadcasting, etc.; may, according to different modulation types, adopt a digital modulation mode or analog modulation mode; and may, depending on a type of the received television signal, demodulate analog and digital signals.

In some optional embodiments, the tuner-demodulator 210 may also in one external device, such as an external set-top box. In this way, the set-top box outputs the television signal after modulation and demodulation, and inputs the signal to the display apparatus 200 through the external device interface 240.

The communicator 220 is a component for communicating with the external devices or external servers according to various communication protocol types. For example, the display apparatus 200 may transmit content data to an external device connected via the communicator 220, or browse and download content data from the external device connected via the communicator 220. The communicator 220 may include a network communication protocol module such as a WIFI module 221, a Bluetooth communication protocol module 222, and a wired Ethernet communication protocol module 223, or a near field communication protocol module, so that the communicator 220 may receive a control signal from the control device 100 according to control of the controller 250, and realize the control signal as a WIFI signal, a Bluetooth signal, a radio frequency signal, etc.

The detector 230 is a component for the display apparatus 200 to collect a signal of an external environment or an external interaction signal. The detector 230 may include a sound collector 231, such as a microphone, which may be used to receive the user's sound, such as a voice signal of the user's control instruction to control the display apparatus 200; or, may collect an ambient sound for recognizing an environmental scenario, so that the display apparatus 200 may adapt to ambient noises.

In some embodiments, the detector 230 may also include an image collector 232, such as a camera and a webcam, which may be used to collect an external environmental scenario to adaptively change display parameters of the display apparatus 200; and may be used to collect user attributes or interact gestures with the user, so as to realize a function of interaction between the display apparatus and the user.

In some embodiments, the detector 230 may further include a light receiver for collecting ambient light intensity to adapt to changes in the display parameters of the display apparatus 200 and the like.

In some other embodiments, the detector 230 may further include a temperature sensor. For example, by sensing an ambient temperature, the display apparatus 200 may adaptively adjust a display color temperature of an image. Exemplarily, in a high temperature environment, the display apparatus 200 may be adjusted to display a cooler color temperature of the image; and in a low temperature environment, the display apparatus 200 may be adjusted to display a warmer color temperature of the image.

The external device interface 240 is a component for the controller 250 to control data transmission between the display apparatus 200 and the external device. The external device interface 240 may be connected with external devices such as set-top boxes, game devices and notebook computers in a wired/wireless manner, and may receive video signals (such as moving images), audio signals (such as music), additional information (such as EPG)) and other data of the external devices.

The external device interface 240 may include: any one or more of a high-definition multimedia interface (HDMI) interface 241, a composite video blanking sync (CVBS) interface 242, an analog or digital component interface 243, a universal serial bus (USB) interface 244, a component interface (not shown in the figure), and red, green and blue (RGB) interfaces (not shown in the figure).

The controller 250 controls work of the display apparatus 200 and responds to user operations by running various software control programs (such as an operation system and various applications) stored in the memory 260. For example, the controller may be implemented as a system-on-a-chip (SOC).

As shown in FIG. 1C, the controller 250 includes a random access memory (RAM) 251, a read only memory (ROM) 252, a graphics processor 253, a CPU processor 254, a communication interface 255, and a communication bus 256. The RAM 251, the ROM 252, the graphics processor 253, the CPU processor 254, and the communication interface 255 are connected through the communication bus 256.

The ROM 252 is configured to store various system startup instructions. For example, when a power signal is received, the display apparatus 200 starts, and the CPU processor 254 executes system startup instructions in the ROM 252 to copy the operation system stored in the memory 260 to the RAM 251, so as to start the operation system. After startup of the operation system is completed, the CPU processor 254 copies various applications in the memory 260 to the RAM 251, and then starts to run and activate various applications.

The graphics processor 253 is configured to generate various graphic objects, such as icons, operation menus and user input instruction display graphics. The graphics processor 253 may include an arithmetic unit for performing operations by receiving various interactive instructions input from the user, thereby displaying various objects according to display attributes; and a renderer for generating various objects obtained based on the arithmetic unit, and displaying rendered results on the display 275.

The CPU processor 254 is configured to execute the operation system and application instructions stored in memory 260 and, according to the instructions received from a user input, execute processing of various applications, data and contents, so as to finally display and play various audio and video contents.

In some embodiments, the CPU processor 254 may include a plurality of processors.

The plurality of processors may include a main processor and one or more sub-processors. The main processor is configured to perform some initialization operations of the display apparatus 200 in a preloading mode of the display apparatus, and/or an operation of displaying a picture in a normal mode. The one or more sub-processor is configured to perform an operation in a state such as a standby mode of the display apparatus.

The communication interface 255 may include a first interface to an $n^{th}$ interface. These interfaces may be network interfaces connected with the external devices via a network.

The controller 250 may control overall operations of the display apparatus 200. For example, in response to receiving a user input command for selecting a GUI object displayed on the display 275, the controller 250 may perform operations related to the object selected by the user input command. For example, the controller may be implemented as an SOC (system-on-chip) or an MCU (micro control unit).

The object may be any of optional objects, such as a hyperlink or an icon. The operation related to the selected object may be, for example, an operation of displaying links to hyperlinked pages and documents, images, or an operation of executing an application corresponding to the object. The user input command for selecting the GUI object may be an input command through various input devices (e.g., a mouse, a keyboard, a touchpad, etc.) connected to the display apparatus 200 or a voice command corresponding to a voice spoken by the user.

The memory 260 is configured to store various types of data, software programs or applications that drive and control running of the display apparatus 200. The memory 260 may include a volatile and/or nonvolatile memory. The memory includes the memory 260, the RAM 251 and ROM 252 of the controller 250, or a memory card in the display apparatus 200.

In some embodiments, the memory 260 is configured to store a program for driving the controller 250 in the display apparatus 200; store various applications built in the display apparatus 200 and downloaded by the user from the external devices; and store data such as various GUIs, various GUI-related objects, and visual effect images of selectors for selecting GUI objects provided by the display 275.

In some embodiments, the memory 260 is configured to store driving programs and related data of the tuner-demodulator 210, the communicator 220, the detector 230, the external device interface 240, the video processor 270, the display 275, and the audio processor 280, such as external data (e.g. audio and video data) received from the external device interface or user data (e.g. key information, voice information, touch information, etc.) received from a user interface.

In some embodiments, the memory 260 stores software and/or programs for representing the operation system (OS). These software and/or programs may include, for example, a kernel, a middleware, an application programming interface (API) and/or applications. Exemplarily, the kernel may control or manage system resources, as well as functions implemented by other programs (such as the middleware, the API or the application); and the kernel may provide interfaces to allow the middleware, the API or the applications to access the controller so as to control or manage the system resources.

Figure 1D:
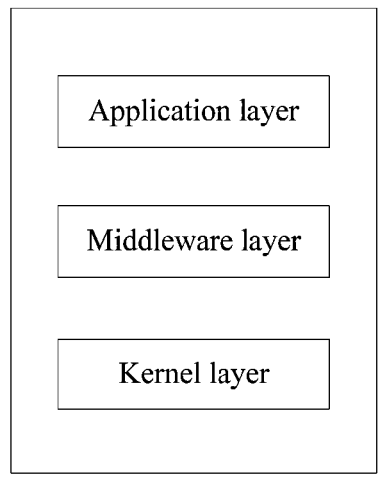
FIG. 1D illustrates a block diagram of architecture configuration of an operation system in a memory of a display apparatus 200.

FIG. 1D illustrates a block diagram of architecture configuration of an operation system in a memory of a display apparatus 200. The architecture of the operation system include an application layer, a middleware layer and a kernel layer from top to bottom.

For the application layer, applications built in the system and non-system level applications both are in the application layer, and are responsible for performing direct interaction with the user. The application layer may include a plurality of applications, such as a setting application, an e-post application and a media center application. These applications may be implemented as web applications, which are executed based on a WebKit engine, and in particular may be developed and executed based on HTML5, cascading style sheets (CSS), and JavaScript.

The middleware layer may provide some standard interfaces to support operations of various environments and systems. For example, the middleware layer may be implemented as multimedia and hypermedia information coding experts group (MHEG) of a data broadcasting-related middleware, may also be implemented as a DLNA middleware related to external device communication, and may also be implemented as a middleware providing a browser environment for running of applications in the display apparatus.

The kernel layer provides core system services, such as: file management, memory management, process management, network management, system security authority management and other services. The kernel layer may be implemented as a kernel based on various operation systems, for example, a kernel based on a Linux operation system.

The kernel layer also provides communication between system software and hardware and provides device driver services for various hardware, such as: a display driver for a display, a webcam driver for a webcam, a key driver a remote control, a WiFi driver for a WIFI module, an audio driver for an audio output port and a power management driver for a power management (PM) module.

The user input interface 265 receives various user interactions. Accordingly, it is configured to send an input signal from the user to the controller 250, or to send an output signal from the controller 250 to the user. Exemplarily, the remote control 100A may send input signals input from the user, such as a power signal, a channel selection signal and a volume adjustment signal, to the user input interface 265, and then the user interface input 265 forwards them to the controller 250; or, the remote control 100A may receive output signals such as audio, video or data output by the controller 250 from the user input interface 265, and display the received output signals or output the received output signals in a form of audio or vibration.

In some embodiments, the user may input commands on the graphic user interface (GUI) displayed on the display 275, and the user input interface 265 receives the user input commands through the GUI. Accordingly, the user input interface 265 may receive the user input commands for controlling positions of selectors in the GUI to select different objects or items.

Or, the user may input commands by inputting specific sounds or gestures, and the user input interface 265 recognizes the sounds or gestures through a sensor and receives the commands.

The video processor 270 is configured to receive an external video signal, and perform video data processing such as decompression, decoding, scaling, noise reduction, frame rate conversion, resolution conversion and image synthesis according to a standard codec protocol of an input signal, so that a video signal to be directly displayed or played on the display 275 may be obtained.

Exemplarily, the video processor 270 includes a demultiplexing module, a video decoding module, an image synthesis module, a frame rate conversion module, a display formatting module, and the like.

The demultiplexing module is configured to demultiplex input audio and video data streams. For example, if an MPEG-2 stream (based on a compression standard of digital storage media moving images and voice) is input, the demultiplexing module will demultiplex it into video and audio signals.

The video decoding module is configured to process the demultiplexed video signal, including decoding and scaling processing.

The image synthesis module, such as an image synthesizer, is configured to superimpose and mix a GUI signal generated by a graphic generator according to user input or by itself and a scaled video image to generate an image signal for display.

The frame rate conversion module is configured to convert a frame rate of an input video. For example, the frame rate of an input 60 Hz video is converted into the frame rate of 120 Hz or 240 Hz, and a usual format is realized by, for example, frame interpolation.

The display formatting module is configured to change a signal output from the frame rate conversion module into a signal that conforms to a display format of, for example, the display, such as converting the signal output from the frame rate conversion module to output an RGB data signal.

The display 275 is configured to receive the image signal input from the video processor 270, and to display a video content, an image and a menu control interface. The displayed video content may be from a video content in a broadcast signal received by the tuner-demodulator 210, or from a video content input from the communicator 220 or the external device interface 240. The display 275 simultaneously displays a user control interface UI generated in the display apparatus 200 and used to control the display apparatus 200.

The display 275 may include a panel for presenting pictures and a driving component for driving image display. Or, if the display 275 is a projection display, it may also include a projection apparatus and a projection screen.

The audio processor 280 is configured to receive an external audio signal and perform audio data processing such as decompression, decoding, noise reduction, digital-to-analogue conversion and scaling processing according to a standard codec protocol of an input signal, so as to obtain an audio signal that may be played in a speaker 286.

Exemplarily, the audio processor 280 may support various audio formats, for example, MPEG-2, MPEG-4, advanced audio coding (AAC), high efficiency AAC (HE-AAC) and other formats.

The audio output port 285 is configured to receive the audio signal output from the audio processor 280 under the control of controller 250. The audio output port 285 may include the loudspeaker 286, or an external sound output terminal 287 of a sound device of the external devices, such as a headphone output terminal.

In some other embodiments, the video processor 270 may include one or more chips. The audio processor 280 may also include one or more chips.

In some other embodiments, the video processor 270 and the audio processor 280 may be separate chips, or may be integrated with the controller 250 in one or more chips.

The power supply 290 is configured to, under the control of the controller 250, provide power support for the display apparatus 200 with power input from an external power supply. The power supply 290 may be a built-in power supply circuit installed inside the display apparatus 200, or may be a power supply installed outside the display apparatus 200.

In some embodiments, the display apparatus 200 and the external devices 400 may have an ARC function. The ARC function is a function in an HDMI specification, and existing multimedia devices, such as televisions, power amplifiers and other devices, all support ARC function.

The ARC function may improve audio quality and also simplify signal transmission between the display apparatus and the external devices. For example, the display apparatus may send the audio signal to a sound bar connected with the display apparatus, a single-box home theater, an AV receiver, or other sound audio devices via the ARC function. A two-way channel is created by establish a "handshake" between the display apparatus and the audio device, so there is no need to run fiber optic audio cables between the display apparatus and the aforementioned devices connected therewith, thus reducing home cabling.

Figure 2:
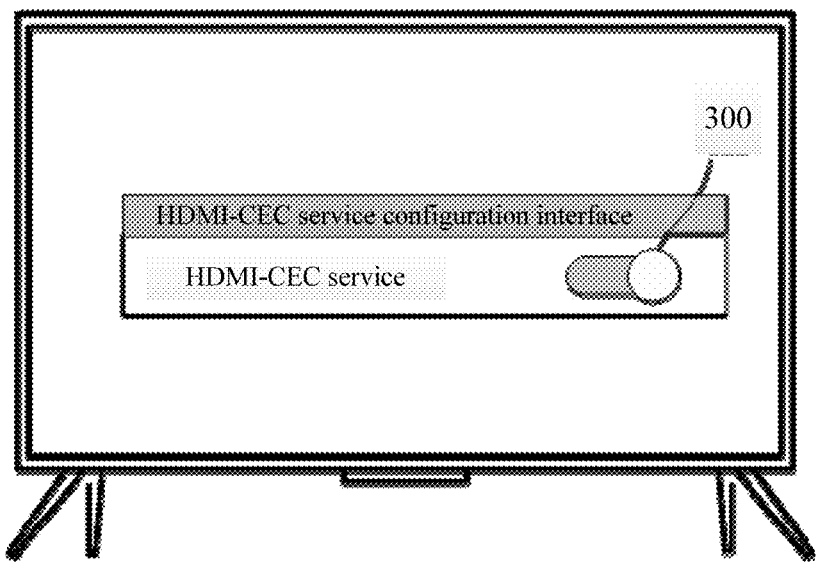
FIG. 2 is a schematic diagram of a HDMI-CEC service configuration interface on a display apparatus.

In some embodiments, the display apparatus 200 and the external device 400 may also enable high definition multimedia interface-consumer electronics control (HDMI-CEC) services, to achieve control over all devices connected via the HDMI interfaces through a single remote control, or a single control device. For example, as shown in FIG. 2, which is a schematic diagram of a HDMI-CEC service configuration interface on a display apparatus, the user may configure the display apparatus to start or turn off HDMI-CEC service by clicking a button 400 on the configuration interface illustrated in FIG. 2 through operating a control device.

In some embodiments, the display apparatus may control a device connected with the HDMI interface through a CEC signal, and realize control functions such as one touch play, system standby, and device waking-up.

For example, the user controls the display apparatus to stand by through pressing a standby button on the control device, and the display apparatus may send the HDMI-CEC signal to the external devices connected through the HDMI interfaces through the HDMI-CEC service, so that the external devices also enter a standby state. For another example, the user may press buttons on the external devices to control the external devices to be powered on, and the external devices may send an HDMI-CEC signal to the display apparatus through the HDMI-CEC service, so that the display apparatus may be automatically powered on and automatically switched to a HDMI signal source to play multimedia content provided by the external devices.

Figure 3:
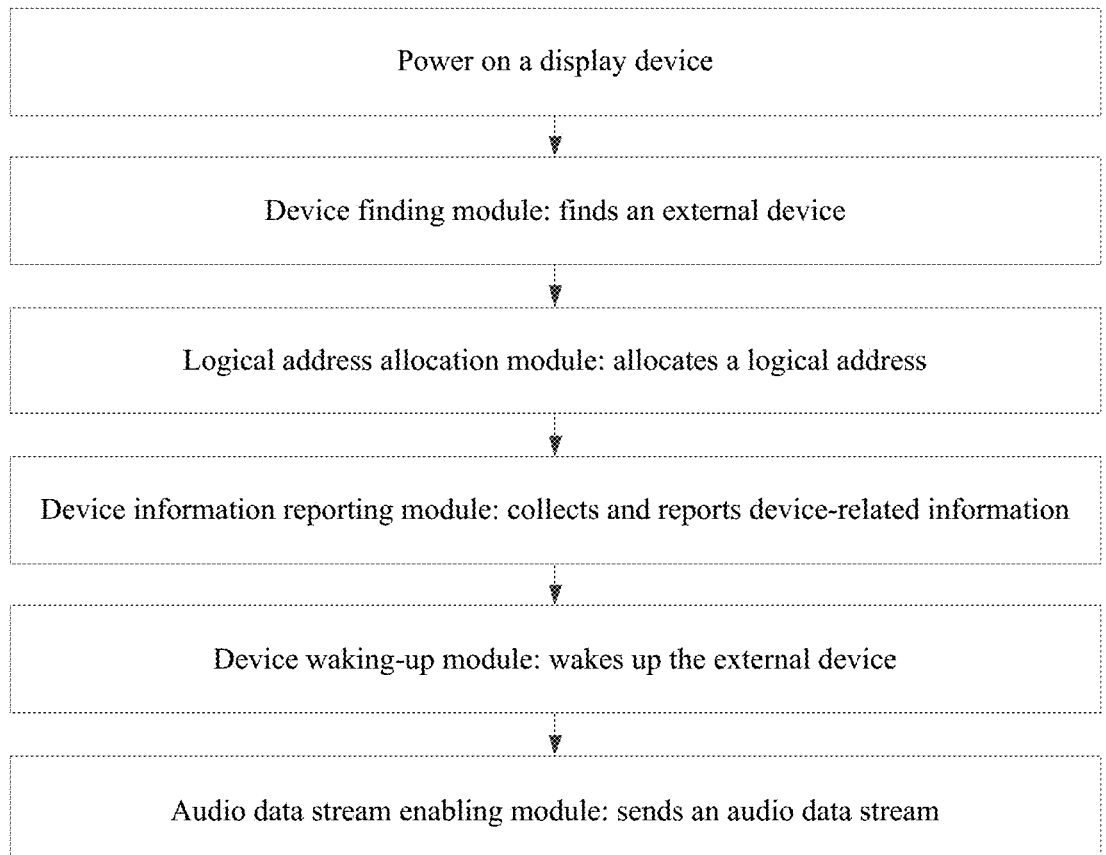
FIG. 3 illustrates a waking-up procedure of an external device.

FIG. 3 illustrates a waking-up procedure of an external device.

As shown in FIG. 3, based on an operation input from a user, for example, through pressing a power key on the control device, the display apparatus is caused to enter a power-on state from the standby state; or, through pressing a power key on the display apparatus, the display apparatus is caused to enter the power-on state from a power-off state.

In some embodiments, taking STR (suspend To RAM) as an example, a procedure of the display apparatus entering from the power-on state to an STR standby state and a procedure of the display apparatus entering from the STR standby state to the power-on state are described.

For example, the user may input a standby instruction to the display apparatus in the power-on state through pressing the power key on the control device. After the display apparatus receives the standby instruction, it stores hardware running state information to a memory (such as an RAM), releases current use hardware resources (such as the display, a hard memory and the external devices), and suspend a process. The PM module controls a power supply circuit to cause other hardware other than the RAM and an MCU to be power down, i.e. controlling the power supply circuit to only provide power supply to the RAM and the MCU. A screen-off broadcast is sent to turn the display off. At this point, the display apparatus enters the STR standby state. When the display apparatus is in the STR standby state, power consumption of the display apparatus may be reduced.

Further, the user may input a power command for causing the display apparatus from standby state to power on state while the display apparatus is in standby state via pressing the power key on the control device, when the display apparatus receives the power command, it reads the hardware running state information from the memory, and performs hardware initialization based on the hardware running state information read from the memory; the PM module controls the power supply circuit to supply power to the hardware, and starts an operation system to restore it to a state before suspending; and a screen-on broadcast is sent to turn on the display. At this point, the display apparatus enters the power-on state. Through the above processing, waiting time for the display apparatus to enter the power-on state from the standby state may be saved, and a startup speed is improved.

After the display apparatus is powered on, in the controller (such as the controller shown in FIG. 1C) of the display apparatus, a device finding module continuously detects whether a new external device accesses the HDMI interfaces of the display apparatus on the bus of the display apparatus through a Polling Thread.

When it is detected that an external device is inserted into the HDMI interface of the display apparatus, in the controller of the display apparatus, a logical address allocation module allocates a corresponding logical address for the external device according to a CEC protocol.

Exemplarily, a procedure of the logical address allocation module allocating the corresponding logical address for the external device includes following processes.

The logical address allocation module obtains the logical address that the external device is set upon manufacturing, such as "5", and checks legitimacy of this logical address afterwards, for example checks whether this logical address has been allocated to other external devices connected to the display apparatus. If not, it is determined that the logical address is legal, so that the logical address is allocated to the external device; or if yes, it is determined that the logical address is illegal, and the logical address allocation module may obtain another logical address set for the external device upon manufacturing, such as "15". The above process is repeated until the corresponding logical address is allocated to the external device.

Then, a device information reporting module in the controller of the display apparatus collects device-related information of the external device, such as a device physical address, a device name, a device manufacturer, and a device power state, and reports the device-related information to a device waking-up module.

Before the display apparatus obtains a physical address of the external device, the display apparatus may establish broadcast communication with the external device, and after the display apparatus obtains the physical address of the external device, point-to-point communication between the display apparatus and the external device may be established through the physical address of the external device.

The device name (OSD name) is used to distinguish multiple external devices connected to the display apparatus, and may be configured to display a connection state of the external device on the UI of the display apparatus.

The device manufacturer is a manufacturer ID (vendor ID) used to distinguish manufacturers of the plurality of external devices that access the display apparatus, that is, brands of the external devices. In some embodiments, the external device may also be quickly initialized according to the manufacturer ID.

In some implementations, the device-related information may include one or a combination of the above-mentioned information, and may also include other device-related information not mentioned in the disclosure.

In addition, each HDMI interface in the display apparatus is configured with a fixed physical address, and external devices accessing different HDMI interfaces correspond to different interface numbers and physical addresses, such as HDMI1, HDMI2, HDMI3, and HDMI4. Through the physical addresses of the HDMI interfaces, the HDMI interface that the external device is connected to may be determined. In some embodiments, the device information reporting module may also collect the physical address of the HDMI terminal connected to the external device and report it to the device waking-up module.

The device waking-up module may send a device waking-up instruction (for example, an instruction sent according to a CEC protocol) to the external device to wake up the external device according to the device-related information and the physical address of the HDMI interface.

In some embodiments, the device waking-up module may also be configured to determine whether the external device has the ARC function. Accordingly, the device waking-up module sends a message for determining whether the external device has the ARC function to the external device, and determines whether the external device has the ARC function according to a response message of the external device. For example, the device waking-up module sends a message req init arc to the external device. If the external device does not respond after receiving the message, the device waking-up module may determine that the external device does not have the ARC function; and if the external device replies an initial arc message after receiving the message, the device waking-up module determines that the external device has the ARC function, and further, an audio data stream enabling module in the display apparatus controller performs its work.

The audio data stream enabling module is configured to enable an external access device that has been woken-up, and sends the processed audio data stream to the external device through a fixed ARC channel.

Here, the ARC channel is an audio data stream transmission channel comprising a controller, an HDMI interface, an HDMI cable and an external device in the display apparatus. The audio data stream output from the display apparatus is sent to the external device via the ARC channel. Here, the audio data stream is an audio signal suitable for the ARC function. For example, a signal waveform of the audio signal suitable for the ARC function is different from that of a conventional audio signal.

Figure 4:
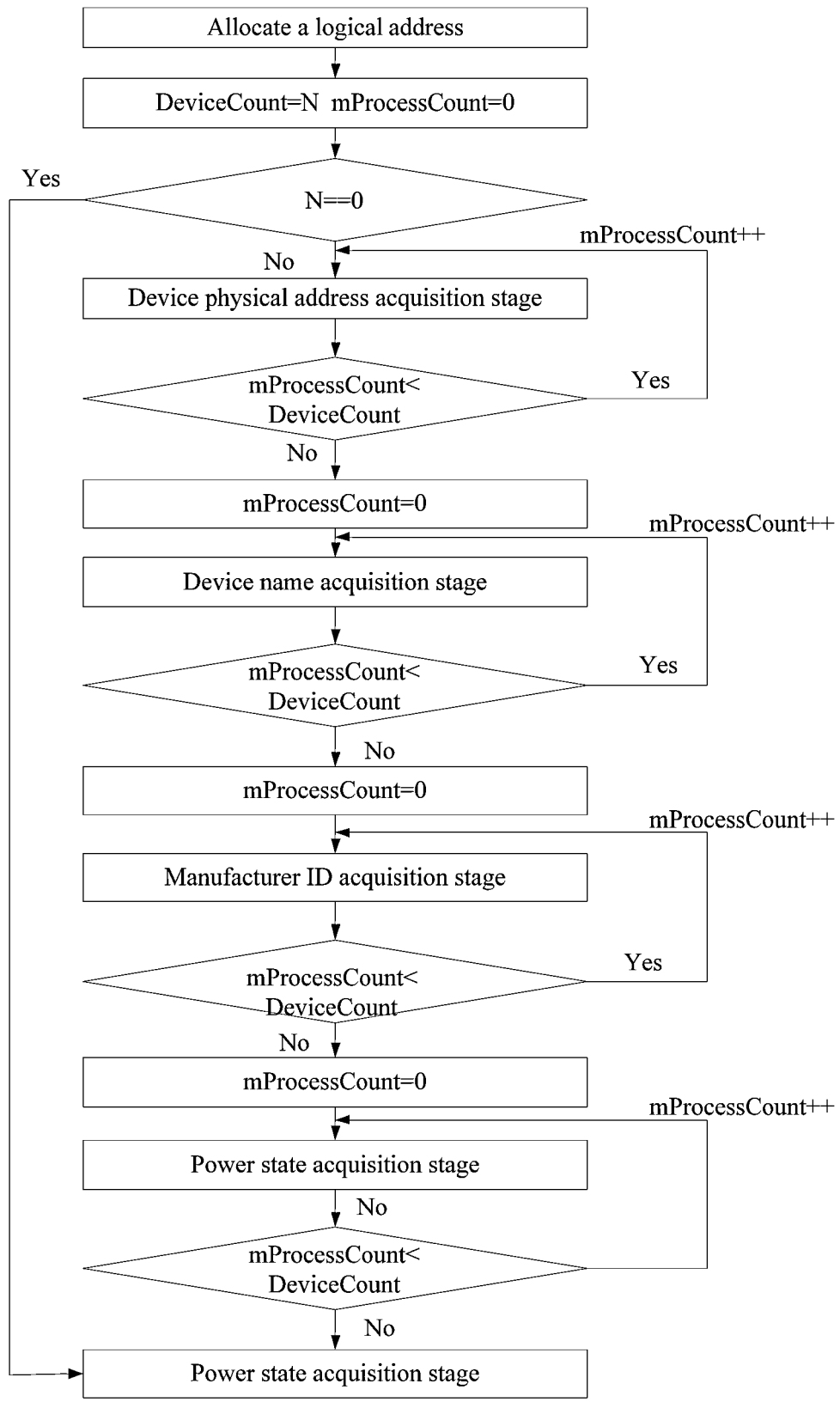
FIG. 4 illustrates a processing procedure of a device information reporting module.

It should be noted that, in the embodiments, the device information reporting module is based on a native code framework of Android system to realize acquisition of the device-related information from the external device and report it to the device waking-up module, and the native code framework of the Android system adopts a strategy for centralized device discovery, centralized processing, and centralized reporting. FIG. 4 illustrates a processing procedure of a device information reporting module, and FIG. 5 illustrates a processing procedure of each stage in FIG. 4.

Figure 5:
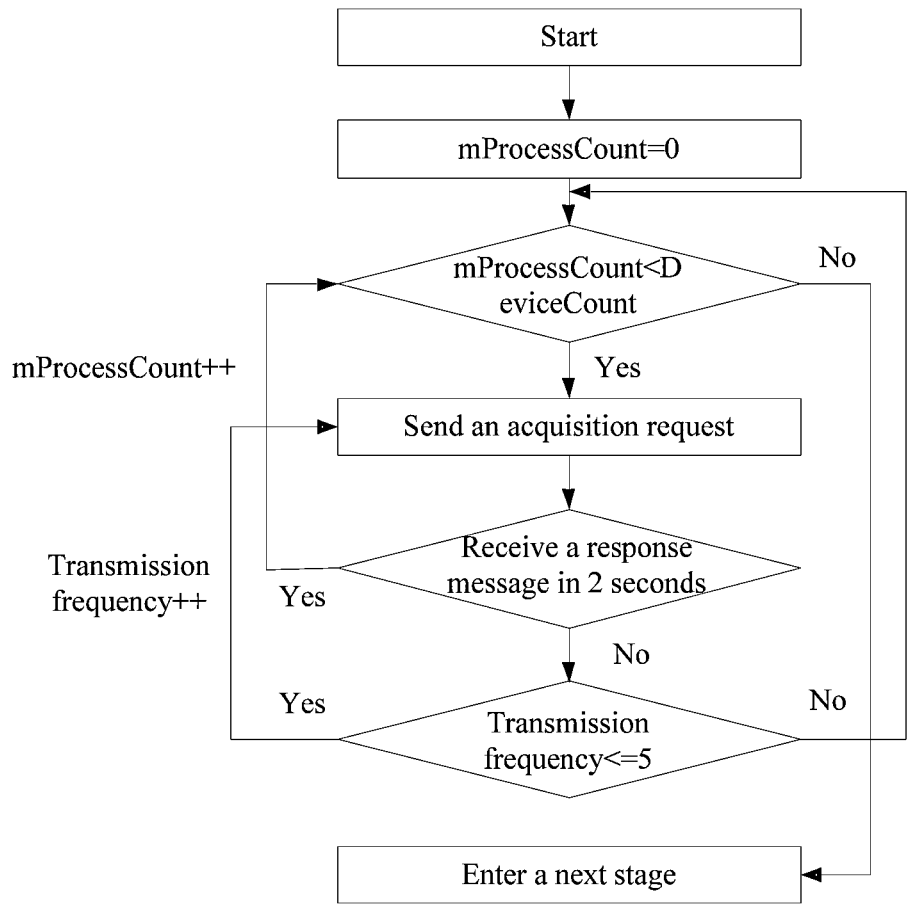
FIG. 5 illustrates a processing procedure of each stage in FIG. 4.

As shown in FIG. 4 and FIG. 5, after the logical address allocation module distributes corresponding logical address for each external device connected, the following five stages are performed in turn: a device physical address acquisition stage, a device name acquisition stage, a manufacturer ID acquisition stage, a power state acquisition stage, and an information packaging and reporting stage.

In any of the above-mentioned first four stages, the device information reporting module sequentially sends an acquisition request for instructing the acquisition of corresponding information to each external device connected to the display apparatus. Each time the device information reporting module receives a response message from an external device, it will add 1 to mProcessCount until mProcessCount is equal to DeviceCount (for indicating the number of external devices connected to the display apparatus), and will enter a next stage. That is, the device information reporting module will only enter the next stage after receiving the response messages from all external devices.

Meanwhile, in any stage of above-mentioned first four stages, if any external device connected to display apparatus does not respond to above-mentioned acquisition request, the device information reporting module will start an overtime retransmission mechanism. In the overtime retransmission mechanism, if the device information reporting module does not receive a response message from the external device within a timeout period (for example, 2 seconds), it may send an acquisition request to the external device again until a response message from the external device is received, or a transmission frequency of the acquisition request reaches a preset number of retransmissions, for example, 5 times. Finally, when power states of all external devices are successfully obtained, the information packaging and reporting stage is entered.

Based on the above description, in an application scenario shown in FIG. 1A, assuming that the direct television set-top box 500 does not respond to the acquisition request in any of the above-mentioned first four stages, for example, the direct TV set-top box 500 does not respond to the message for the device physical address and manufacturer ID, the overtime retransmission mechanism will be enabled in the first four stages shown in FIG. 4. For example, if the acquisition request is retransmitted 5 times with an interval of 2 s each time, the device physical address acquisition stage will take 5*2 s, and the manufacturer ID acquisition stage takes 5*2 s. Further, if the DVD 600 does not respond to the acquisition request in any of the first four stages, it will take longer time, such as 44 seconds, to wake up the audio device.

In view of the above issues, the disclosure provides a method for waking up an audio device.

Figure 6:
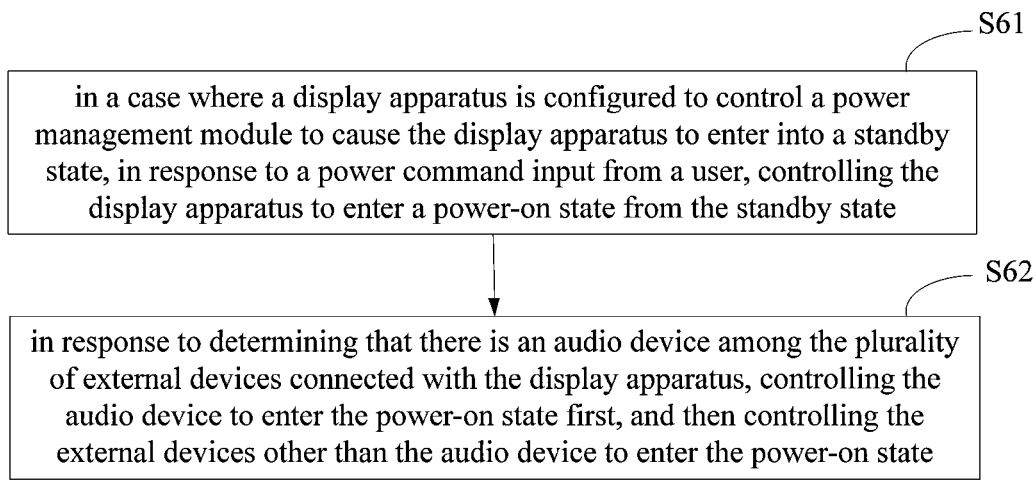
FIG. 6 illustrates a flow diagram of a method or waking up an audio device.

FIG. 6 illustrates a flow diagram of a method for waking up an audio device, including the following steps:
   Step S61: in a case where a display apparatus is configured to control a power management module to cause the display apparatus to enter into a standby state, in response to a power command input from a user, controlling the display apparatus to enter a power-on state from the standby state; and
   Step S62: in response to determining that there is an audio device among the plurality of external devices connected with the display apparatus, controlling the audio device to enter the power-on state first, and then controlling the external devices other than the audio device to enter the power-on state.

In some embodiments, it may be determined whether an external device is an audio device through a logical address allocated to the external device. For example, a logical address of 5 indicates that the device type is an audio device, and a logical address of 4, or 8, or 11 indicates that the device type is a DVD device.

In some embodiments, in response to determining that the device type of the external device is an audio device by the logical address allocated to the external device, the logical address may be stored in a first list which is set in advance, and similarly, after it is determined that the external device is not an audio device through the logical address allocated to the external device, the logical address may be stored in a second list which is set in advance.

Based on this, a device information reporting module may first check whether there is a first list when collecting device-related information of the external device, if there is, then the device information reporting module first collects device-related information of the audio device according to the logical address in the first list, such as performing the above-mentioned device physical address acquisition stage, device name acquisition stage, manufacturer ID acquisition stage, power state acquisition stage, and information packaging and reporting stage in sequence, and sending a device waking-up instruction to the audio device to cause it to enter a power-on state; and after the device-related information of the audio device is reported, the device-related information of other external devices except for the audio device in the plurality of external devices is collected according to the logical address in the second list, and a device waking-up instruction is sent to other external devices to cause them to enter the power-on state.

It can be seen that, by the method provided by the disclosure, time consumption for waking up the audio device after the display apparatus is powered on may be shortened, thus improving an efficiency of waking up the audio device and improving the user experience.

In some embodiments, in order to further improve the waking-up efficiency of the audio device after the display apparatus is powered on, the disclosure further proposes the following process.

Because in the device-related information: the device name is configured to distinguish multiple external devices connected to the display apparatus, and may be configured to display connection states of the external device on a UI of the display apparatus. The manufacturer ID is configured to distinguish manufacturers of multiple external devices connected to the display apparatus, that is, brands of the external devices. These information does not need to be used immediately before the device wakes up.

Therefore, the device name acquisition stage and the manufacturer ID acquisition stage in the processing flow of the device information reporting module exemplified in FIG. 4 may be adjusted to be performed after the audio device is woken up. In this way, the time for obtaining the device-related information may be shortened, thereby further shortening the waking-up time of the device.

It can be seen that the above-mentioned improvement may further shorten the waking-up time of the audio device after the display apparatus is powered on, so an efficiency of waking up the audio device is improved and the user experience is improved.

It should be noted that the above embodiments are only in order to illustrate the application. Although the application has been described in detail with reference to the foregoing embodiments, those of ordinary skill in the art should understand that it is still possible to modify the foregoing embodiments without departing from the spirits of the disclosure.

What is claimed is:
1. A display apparatus, comprising:
a display;
a user input interface configured to receive an instruction input from a user;
a plurality of HDMI interfaces configured to connect to a plurality of external devices;
a power management module configured to at least control the display to power-down or power on to cause the display apparatus to enter into a standby state or a power-on state; and
a controller in connection with the display, the user input interface and the power management module and configured to:
while the display apparatus is in the standby state, in response to a power command input from the user, control the power management module to cause the display apparatus to enter the power-on state from the standby state, in response to determining that there is an audio device among the plurality of external devices, control the power management module to cause the audio device to enter the power-on state first, and then control the power management module to cause other external devices among the plurality of external devices except for the audio device to enter the power-on state;

wherein the audio device is determined by a logical address allocated to an external device;

wherein the controller is further configured to:
  obtain device-related information of the audio device, and send a waking-up instruction to the audio device to cause the audio device to enter the power-on state;
  obtain device-related information of the other external devices among the plurality of external devices, and send a waking-up instruction to each of the other external devices to cause each of the other external devices to enter the power-on state;
  determine whether a logical address of a first external device is a logical address for an audio device;
  in response to the logical address of the first external device being the logical address for the audio device, place the logical address of the first external device into a first list;
  in response to the logical address of the first external device being not the logical address for the audio device, place the logical address of the first external device into a second list
  check whether there is a second audio device in the first list before checking the second list; and
  in response to that there is a second audio device in the first list, cause a device information reporting module first collect device-related information of the second audio device according to the logical address of the second audio device in the first list before checking the second list.

2. The display apparatus according to claim 1; wherein the device-related information at least comprises one of following: a device physical address, a device name, a device manufacturer, or a device power state.

3. The display apparatus according to claim 2, wherein the controller is further configured to: obtain a device physical address of an external device, a device name of the external device, a device manufacturer of the external device, and a device power state of the external device in time order.

4. The display apparatus according to claim 1, wherein the controller is further configured to:
  after sending the waking-up instruction to the audio device to cause the audio device to enter the power-on state, obtain device-related information of the audio device.

5. A method for waking up an audio device connected with a display apparatus, comprising:
  while the display apparatus is in a standby state, in response to a power start command input from a user, controlling the display apparatus to enter a power-on state from the standby state;
  in response to determining that there is an audio device among a plurality of external devices connected with the display apparatus via HDMI interfaces, controlling the audio device to enter the power-on state first, and then controlling other external devices among the plurality of external devices except for the audio device to enter the power-on state; wherein the audio device is determined by a logical address allocated to an external device;
  obtaining device-related information of the audio device, and sending a waking-up instruction to the audio device to cause the audio device to enter the power-on state;
  obtaining device-related information of the other external devices among the plurality of external devices, and sending a waking-up instruction to each of the other external devices to cause each of the other external devices to enter the power-on state;
  determining whether a logical address of a first external device is a logical address for an audio device;
  in response to the logical address of the first external device being the logical address for the audio device, placing the logical address of the first external device into a first list;
  in response to the logical address of the first external device being not the logical address for the audio device, placing the logical address of the first external device into a second list;
  checking whether there is a second audio device in the first list before checking the second list; and
  in response to that there is a second audio device in the first list, first collecting device-related information of the second audio device according to the logical address of the second audio device in the first list before checking the second list.

6. The method according to claim 5, wherein the device-related information at least comprises one of following: a device physical address, a device name, a device manufacturer, or a device power state.

7. The method according to claim 6, further comprising:
  obtaining a device physical address of an external device, a device name of the external device, a device manufacturer of the external device, and a device power state of the external device in time order.

8. The method according to claim 3, further comprising:
  after sending the waking-up instruction to the audio device to cause the audio device to enter the power-on state, obtaining device-related information of the audio device.

* * * * *